F. A. DOWLER.
PNEUMATIC TRANSMISSION.
APPLICATION FILED SEPT. 18, 1913.
1,122,877.
Patented Dec. 29, 1914.
2 SHEETS—SHEET 1.
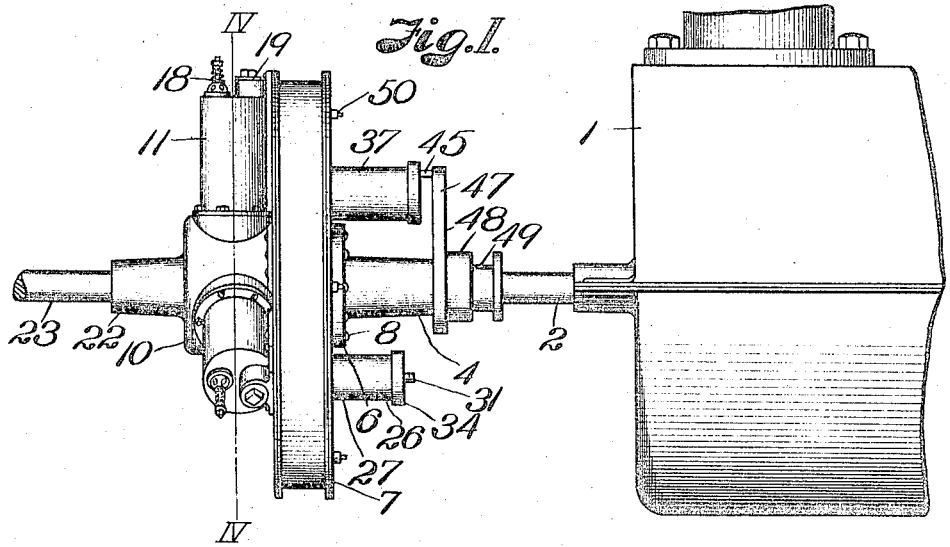
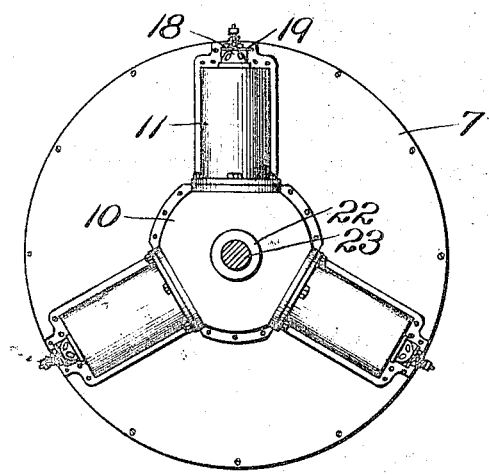
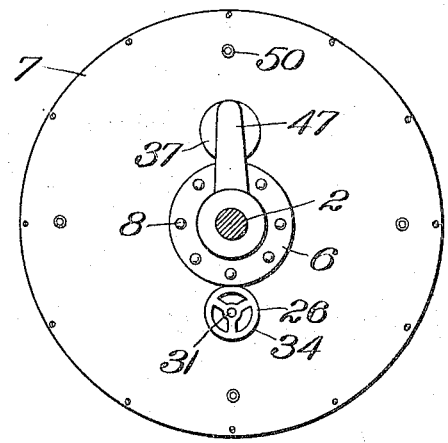
WITNESSES:
Arthur W. Caps.
L. E. Coats.
INVENTOR
F. A. Dowler.
BY
ATTORNEY

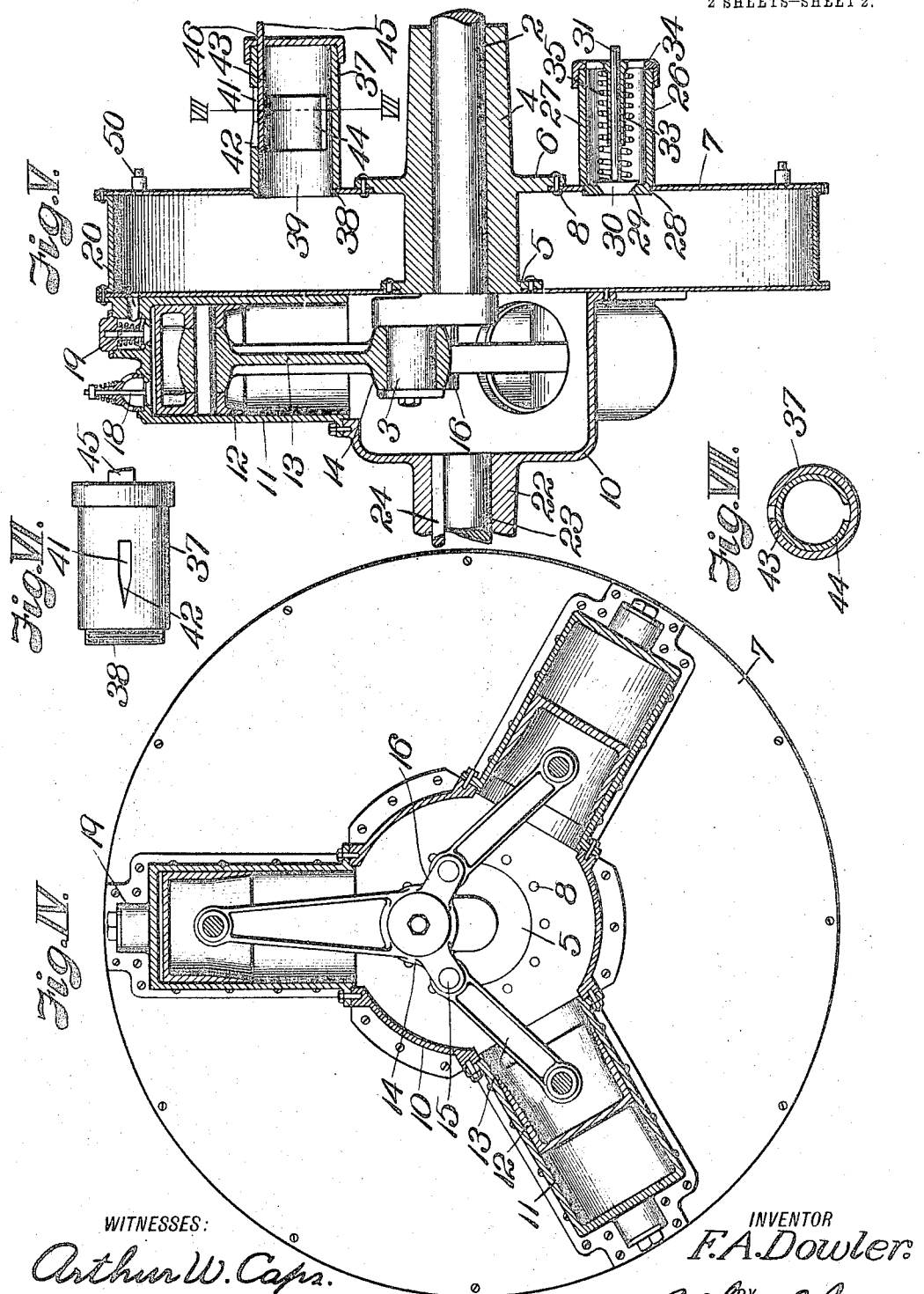

UNITED STATES PATENT OFFICE.

FRANK A. DOWLER, OF LAWRENCE, KANSAS.

PNEUMATIC TRANSMISSION.

1,122,877. Specification of Letters Patent. Patented Dec. 29, 1914.

Application filed September 18, 1913. Serial No. 790,445.

*To all whom it may concern:*

Be it known that I, FRANK A. DOWLER, a citizen of the United States, residing at Lawrence, in the county of Douglas and State of Kansas, have invented certain new and useful Improvements in Pneumatic Transmission; and I do declare the following to be a full, clear, and exact description of the invention such as will enable others skilled in the art to which it appertains to make and use the same, reference being had to the accompanying drawings, and to the letters and figures of reference marked thereon, which form a part of this specification.

My invention relates to a pneumatic transmission, and has for its principal object to provide a power transmission mechanism wherein a compressor is actuated by any suitable prime mover and the fluid pressure medium generated in the compressor utilized to actuate a driven part.

It is also an object of the invention to provide controlling mechanism whereby pressure in the compressor may be varied, in order to vary the speed of the driven parts, so that such parts may be operated at variable speeds independently of the speed of the prime mover.

In accomplishing these, and other objects of the invention, I have provided improved details of structure, the preferred forms of which are illustrated in the accompanying drawings, wherein:—

Figure I is an end view of a pneumatic transmission constructed according to my invention, showing its prime mover and driven shaft. Fig. II is an elevation of the pump side of the device. Fig. III is an elevation of the opposite side of the device. Fig. IV is a sectional elevation of the transmission, on the line IV—IV, Fig. I. Fig. V is a central transverse section of the transmission. Fig. VI is an elevation of the throttle valve through which the compressor chamber is manually relieved. Fig. VII is a cross-section of the throttle valve on the line VII—VII, Fig. V.

Referring more in detail to the parts:—1 designates a prime mover of any suitable construction, here indicated as a gas engine having a crank shaft 2.

Revolubly mounted on the shaft 2, adjacent the crank 3, is a sleeve 4 having spaced flanges 5 and 6; the outer of which is of less diameter than the inner in order that the compressor housing 7 may be moved thereover to be secured to the outer faces of the flanges by rivets or bolts 8.

Fixed to the outer face of the compressor housing is a crank case 10, within which the crank 3 of the drive shaft is adapted to revolve, and opening from said housing are radial cylinders 11, here shown to be three in number, and each provided with a piston 12, having a connecting rod 13 connected with a collar 14 that is revolubly mounted on the crank 3; the preferred construction of the mounting being that illustrated, wherein one of the connecting rods is integral with the collar and the other connecting rods pivotally mounted on pins 15 that project laterally from ears 16 on said collar.

Each of the cylinders has an automatic intake valve 18, of any suitable type, and an exhaust valve 19, having a channel 20 communicating with the compressor chamber, so that air compressed within the cylinders is delivered into the compressor.

On the outer end of the crank case is a sleeve 22 into which the end of a driven shaft 23 is projected and rigidly connected with the collar by a key or the like 24, so that the driven shaft is revolved when the compressor and crank case are revolved.

In order that an overload will not be thrown on the prime mover when all the parts are in driving relation, a maximum pressure in the compressor chamber must be determined and means provided for automatically relieving the pressure at this point. In accomplishing such relief, I provide an automatic valve 26, comprising a housing 27, having a shank 28 threaded into an aperture in the side of the compressor chamber, and provided with a valve port 29, within which a valve 30 is adapted to seat.

A stem 31 projects outwardly from the valve 30 through a sleeve 33 on an apertured cap 34 that is threaded onto the outer end of the housing, and a spring 35 surrounds the stem and bears against the valve in its seat.

It is apparent that maximum pressure within the compressor may be varied by manipulating the cap 34 to vary the tension of the spring 35. It is also apparent that if the apparatus is to be used as a power transmission, wherein variable speed of the driven parts is essential, some provision must be made for throttling the pressure medium. The mechanism provided for this purpose comprises the housing 37, (Figs. V to VII), having a shank 38 threaded into the opening in the side of the compressor chamber, and provided with an intake port 39, through which air may pass from the interior of the chamber to the interior of the housing. The housing is provided with a port 41, having a tapered inner end 42, and located within the housing is a slide valve 43, having spring arms 44 for yieldingly retaining same in close contact with the interior of the housing, and having a stem 45 projecting through an opening 46 in the outer end of the housing, and connected with an arm 47 on a collar 48 that is slidably mounted on the drive shaft 2, and has a groove 49 for receiving the end of a shipper lever (not shown). With this construction, the slide valve may be actuated to vary the opening of the port and thereby control the volume of pressure medium within the compressor chamber to govern the actuation of the driven parts.

In order that air may be drawn from the compressor to fill tires, when the transmission is used on automobiles, I provide the compressor with nozzle tips 50, to which a hose, or the like, (not shown) may be attached and connected with the air tube of the tire, in order to draw air from the compressor and fill the tire. It is apparent that the compressor can be used for this purpose only when the parts are locked, to prevent revolution of the compressor. In using the transmission, presuming the parts to be constructed and assembled as described, when the motor is in operation, the crank shaft is revolved and actuates the pumps, so that the latter force air into the compressor chamber.

When the motor is first started in operation, the load on the driven shaft is sufficient to hold the shaft and compressor chamber against revoluble movement with the driving shaft, so that the latter turns within the sleeve 4, but as soon as sufficient pressure has accumulated in the compressor chamber, back pressure on the pumps becomes greater than the load on the driven shaft, so that the pump pistons are gradually stopped by the air within the compressor chambers and cylinders, and the pistons locked, so that instead of the drive shaft revolving idly within the compressor sleeve, the compressor is carried around with the shaft and revolves the driven shaft 23 and the parts connected therewith.

If the maximum load to be carried by the transmission is to be that equal to a pressure of five hundred pounds within the compressor, the relief valve may be set to open automatically when pressure of air within the compressor exceeds that load, or the relief valve may be adjusted for higher or lower pressure by manipulation of the cap 34 to vary the tension of the valve spring and vary the maximum load.

It is a well known principle that the efficiency of a gas engine decreases rapidly with a decrease in the R. P. M. of the drive shaft and flywheel, so that with the present structure if it is desired to run the driven shaft at a low speed, provision must be made for accomplishing this purpose, otherwise than by reducing the R. P. M. of the drive shaft. This is accomplished by equipping the compressor with the throttle valve whereby air may be exhausted from the compressor chamber to divide the force of the driven shaft between the pumps and the driven shaft, so that only part of the driving force is applied to the driven shaft, and the speed thereof reduced without reducing the R. P. M. of the drive shaft.

When the compressor is used on automobiles, and it is desired to use air from the compressor for filling tires, the wheels of the vehicle are locked to increase the load of the driven shaft and the compressor operated to secure a supply of compressed air. A hose is then attached to one of the nozzle tips on the compressor and connected with the tube of a tire, so that air may be drawn from the compressor into the tire.

Having thus described my invention, what I claim as new therein, and desire to secure by Letters-Patent, is:—

1. The combination with driving and driven members, of a compressor chamber having fixed connection with one of said members, and pressure generating mechanism carried by said chamber and operatively connected with the other member.

2. The combination with driving and driven members, of an air compressor having fixed connection with one of said members and operative connection with the other member, and a throttle valve for controlling said compressor.

3. The combination with separate members, of a compressor chamber in fixed relation to one of said members, a pump mounted on said chamber and having communication therewith, and means operatively connected with the other member for actuating said pump.

4. The combination with separate members, of a compressor chamber fixed to one of said members, a pump cylinder mounted on the compressor chamber and having communication therewith, a shaft journaled in said compressor chamber, and a piston located in said pump cylinder and having operative connection with said shaft.

5. The combination with separate revoluble shafts, of a compressor chamber fixed on one of said shafts, and means operable from the other shaft for delivering fluid under pressure to the compressor chamber to form a cushion, and whereby additional fluid is delivered against said cushion to move the compressor chamber and the other shaft.

6. The combination with driving and driven members, of a compressor chamber revolubly mounted on the driving member and having fixed connection with the driven member, pumps mounted on said compressor chamber and having communication therewith, means for operating the pumps from the driving member, and whereby said compressor chamber is locked to the driving member when pressure therein has reached a predetermined point.

7. The combination with driving and driven members, of a compressor chamber revolubly mounted on the driving member and having fixed connection with the driven member, pumps mounted on said compressor chamber and having communication therewith, means for operating the pumps from the driving member and whereby said compressor chamber is locked to the driving member when pressure therein has reached a predetermined point, and a throttle valve on said compressor chamber, for the purpose set forth.

8. The combination with driving and driven members, of a compressor chamber revolubly mounted on the driving member and having fixed connection with the driven member, pumps mounted on said compressor chamber and having communication therewith, means for operating the pumps from the driving member whereby said compressor chamber is locked to the driving member when pressure therein has reached a predetermined point, and a relief valve on said compressor chamber.

9. The combination with driving and driven members, of a compressor chamber revolubly mounted on the driving member and having fixed connection with the driven member, pumps mounted on said compressor chamber and having communication therewith, means for operating the pumps from the driving member whereby said compressor chamber is locked to the driving member when pressure therein has reached a predetermined point, an adjustable relief valve on said compressor chamber for automatically exhausting air therefrom, and a throttle valve on the compressor chamber whereby the pressure therein is manually controlled.

10. The combination with a crank shaft and means for actuating same, of a driven shaft, a compressor chamber revolubly mounted on the crank shaft, pumps fixed and operatively connected with the compressor and crank shaft respectively, and a driven shaft in fixed relation to said compressor chamber.

11. The combination with a compressor chamber having a central sleeve bearing, of a crank case on said compressor chamber, pump cylinders communicating with the compressor chamber and with the crank case, pistons having connecting rods operatively connected with said crank shaft within said case, and a driven shaft fixed to said crank case.

12. The combination with a crank shaft, of a sleeve revolubly mounted on said crank shaft and having inner and outer flanges of different diameter, a compressor chamber adapted to pass over the flange of less diameter and for attachment to said flanges, a crank case on said compressor chamber, a shaft revolubly mounted in said sleeve and having a crank part within said case, pump cylinders communicating with the interior of the compressor chamber and with said case, pistons in said cylinders having connecting rods operatively mounted on the crank part of said shaft, and a driven shaft fixed to said crank case.

13. The combination with driving and driven members, of a compressor chamber revolubly mounted on the driving member and having fixed connection with the driven member, pumps mounted on said compressor chamber and having communication therewith, means for operating the pumps from the driving member, and whereby said compressor chamber is locked to the driving member when pressure therein has reached a predetermined point, and tips having communication with the compressor chamber and adapted for carrying a hose.

In testimony whereof I affix my signature in presence of two witnesses.

FRANK A. DOWLER.

Witnesses:
  Max Wilhelmi,
  Max Franz Wilhelmi.